US011908289B2

(12) United States Patent
Takata

(10) Patent No.: US 11,908,289 B2
(45) Date of Patent: Feb. 20, 2024

(54) POS DEVICE AND CONTROL METHOD

(71) Applicant: NEC Corporation, Tokyo (JP)

(72) Inventor: Tsugunori Takata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/763,501

(22) PCT Filed: Sep. 15, 2016

(86) PCT No.: PCT/JP2016/004202
§ 371 (c)(1),
(2) Date: Mar. 27, 2018

(87) PCT Pub. No.: WO2017/056428
PCT Pub. Date: Apr. 6, 2017

(65) Prior Publication Data
US 2018/0268666 A1  Sep. 20, 2018

(30) Foreign Application Priority Data
Sep. 30, 2015 (JP) ................. 2015-195081

(51) Int. Cl.
G07G 1/12  (2006.01)
G07G 1/00  (2006.01)
(Continued)

(52) U.S. Cl.
CPC ............. G07G 1/12 (2013.01); G06Q 20/18 (2013.01); G07F 5/24 (2013.01); G07F 9/04 (2013.01);
(Continued)

(58) Field of Classification Search
CPC ....................................................... G07G 1/12
(Continued)

(56) References Cited

U.S. PATENT DOCUMENTS 9,520,033 B2 * 12/2016 Freedman ............. G07F 19/203
2003/0067416 A1 * 4/2003 Kim ...................... G06F 1/1601
345/1.1
(Continued)

FOREIGN PATENT DOCUMENTS

JP  S48-038238 Y  11/1973
JP  S51-059695 A   5/1976
(Continued)

OTHER PUBLICATIONS

1 Japanese Office Action for JP Application No. 2015-195081 dated Nov. 5, 2019 with English Translation.
(Continued)

Primary Examiner — Rafferty D Kelly

(57) ABSTRACT

The present invention makes it possible to allow a customer to insert money into a payment device without the customer giving the money to a sales clerk. Provided is a POS device, including a product registration device (10) and a payment device (20). Registration of products is carried out with the product registration device (10). Payment for the products which are registered with the product registration device (10) is carried out with the payment device (20). The payment device (20) further comprises a first insertion port (212a) and a second insertion port (212b). It is possible to insert coins into the first insertion port (212a). It is possible to insert coins into the second insertion port (212b).

17 Claims, 19 Drawing Sheets

(51) Int. Cl.
  *G07F 9/04* (2006.01)
  *G07G 1/06* (2006.01)
  *G07F 5/24* (2006.01)
  *G06Q 20/18* (2012.01)
  *G07G 1/01* (2006.01)

(52) U.S. Cl.
  CPC ......... *G07G 1/0009* (2013.01); *G07G 1/0036* (2013.01); *G07G 1/0045* (2013.01); *G07G 1/01* (2013.01); *G07G 1/06* (2013.01)

(58) Field of Classification Search
  USPC .......................................................... 235/383
  See application file for complete search history.

(56) References Cited

U.S. PATENT DOCUMENTS

| | | | | |
|---|---|---|---|---|
| 2009/0090783 | A1* | 4/2009 | Killian | G06Q 20/3229 235/492 |
| 2009/0101723 | A1* | 4/2009 | Uehara | G07G 1/14 235/7 A |
| 2014/0290539 | A1* | 10/2014 | Tagashira | G06Q 20/20 109/53 |

FOREIGN PATENT DOCUMENTS

| | | |
|---|---|---|
| JP | H04-160494 A | 6/1992 |
| JP | H05342475 A | 12/1993 |
| JP | H0660271 A | 3/1994 |
| JP | H07-013069 U | 3/1995 |
| JP | H08-161637 A | 6/1996 |
| JP | H10-162207 A | 6/1998 |
| JP | H11-73580 A | 3/1999 |
| JP | 2000-149090 A | 5/2000 |
| JP | 2004-133735 A | 4/2004 |
| JP | 2007-323232 A | 12/2007 |
| JP | 2010015532 A | 1/2010 |
| JP | 2010-287139 A | 12/2010 |
| JP | 2011-054007 A | 3/2011 |
| JP | 2011118568 A * | 6/2011 |
| JP | 2013012002 A | 1/2013 |
| JP | 2013-206423 A | 10/2013 |
| JP | 2013246832 A | 12/2013 |
| JP | 2014-067362 A | 4/2014 |
| JP | 2014-207021 A | 10/2014 |
| JP | 2016-081142 A | 5/2016 |

OTHER PUBLICATIONS

Japanese Office Action for JP Application No. 2020-017837 dated Nov. 24, 2020 with English Translation.
Japanese Office Action for JP Application No. 2020-017837 dated Feb. 16, 2021 with English Translation.
Office action in counterpart JP patent application 2021-133737, dated Oct. 7, 2022.
Japanese Office Communication for JP Application No. 2021-133737 dated Jan. 31, 2023 with English Translation.
Japanese Office Action for JP Application No. 2020-017837 dated Apr. 27, 2021 with English Translation.
International Search Report for PCT Application No. PCT/JP2016/004202, dated Dec. 20, 2016.
English translation of Written opinion for PCT Application No. PCT/JP2016/004202.

* cited by examiner

POS DEVICE AND CONTROL METHOD

REFERENCE TO RELATED APPLICATION

The present application is a National Stage Entry of PCT/JP2016/004202 filed on Sep. 15, 2016, which is based on and claims the benefit of the priority of Japanese Patent Application No. 2015-195081, filed on Sep. 30, 2015, the disclosures of all of which are incorporated herein in their entirety by reference.

TECHNICAL FIELD

The present invention relates to a point-of-sales (POS) device.

BACKGROUND ART

A POS device is sometimes used to settle payment for a commodity purchased by a customer in a retail store such as a supermarket. Various POS devices have been currently developed. Such a POS device includes a commodity registration device and a settlement device. The commodity registration device registers a commodity. The settlement device settles payment for a commodity registered by the commodity registration device.

A POS device described in PTL 1 includes a settlement device disposed below a commodity registration device. The settlement device is rotatable. Thus, by rotating the settlement device, the settlement device can be faced to a clerk side, and the settlement device can further be faced to a customer side.

A POS device described in PTL 2 includes a settlement device housed in a housing unit. Two placing units are placed on side surfaces of the housing unit. These two placing units are located opposite to each other with the settlement device therebetween. Change can be placed on each of these two placing units.

A POS device described in PTL 3 includes a commodity registration device and a settlement device formed by using the same base substance. In this POS device, a customer himself/herself registers a commodity by the commodity registration device, and the customer then settles payment by the settlement device.

A POS device described in PTL 4 calculates an approximate amount of a customer's commodity on the basis of a processing result of image data generated by capturing an image of the commodity. In PTL 4, a customer pays an approximate amount after the approximate amount is calculated. A clerk then registers the commodity in a commodity registration device while the customer is paying the approximate amount. Thus, an accurate amount of the commodity is calculated. Subsequently, a difference between the accurate amount and the approximate amount of the commodity is processed.

CITATION LIST

Patent Literature

[PTL 1] Japanese Laid-open Patent Publication No. 2014-207021
[PTL 2] Japanese Laid-open Patent Publication No. 2013-206423
[PTL 3] Japanese Laid-open Patent Publication No. 2013-12002
[PTL 4] Japanese Laid-open Patent Publication No. 2014-67362

SUMMARY OF INVENTION

Technical Problem

The inventor of the present invention has considered a method for quickly completing settlement when a settlement device is used to settle payment for a commodity. As a result, the inventor has thought that settlement can be quickly completed when a customer can put money in the settlement device without giving the money to a clerk.

An object of the present invention is to allow a customer to put money in a settlement device without giving the money to a clerk.

Solution to Problem

The present invention provides a POS device that is a POS device settling payment for a commodity and that includes a first input port capable of being put currencies into and a second input port capable of being put the currencies into.

Advantageous Effects of Invention

The present invention allows a customer to put money in a settlement device without giving the money to a clerk.

BRIEF DESCRIPTION OF DRAWINGS

FIG. 9 is a perspective view of the settlement device illustrated in

FIG. 8 as seen from an opposite side;

DESCRIPTION OF EMBODIMENTS

Figure 1:
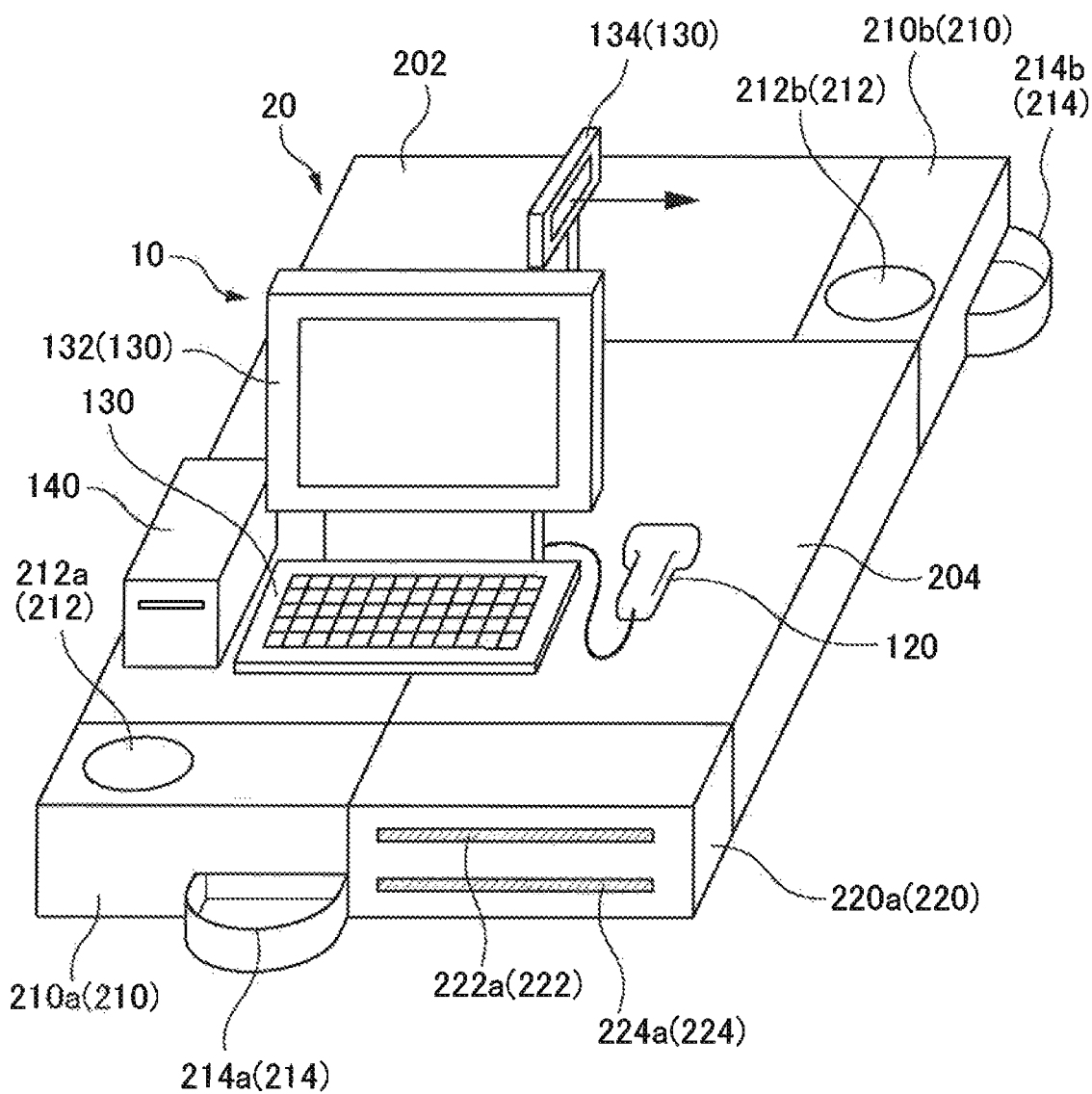
FIG. 1 is a perspective view illustrating a configuration of a POS device according to a first example embodiment.

Hereinafter, example embodiments of the present invention will be described by using the drawings. Note that the same components have the same reference numerals in all the drawings, and description thereof will be appropriately omitted.

First Example Embodiment

Figure 2:
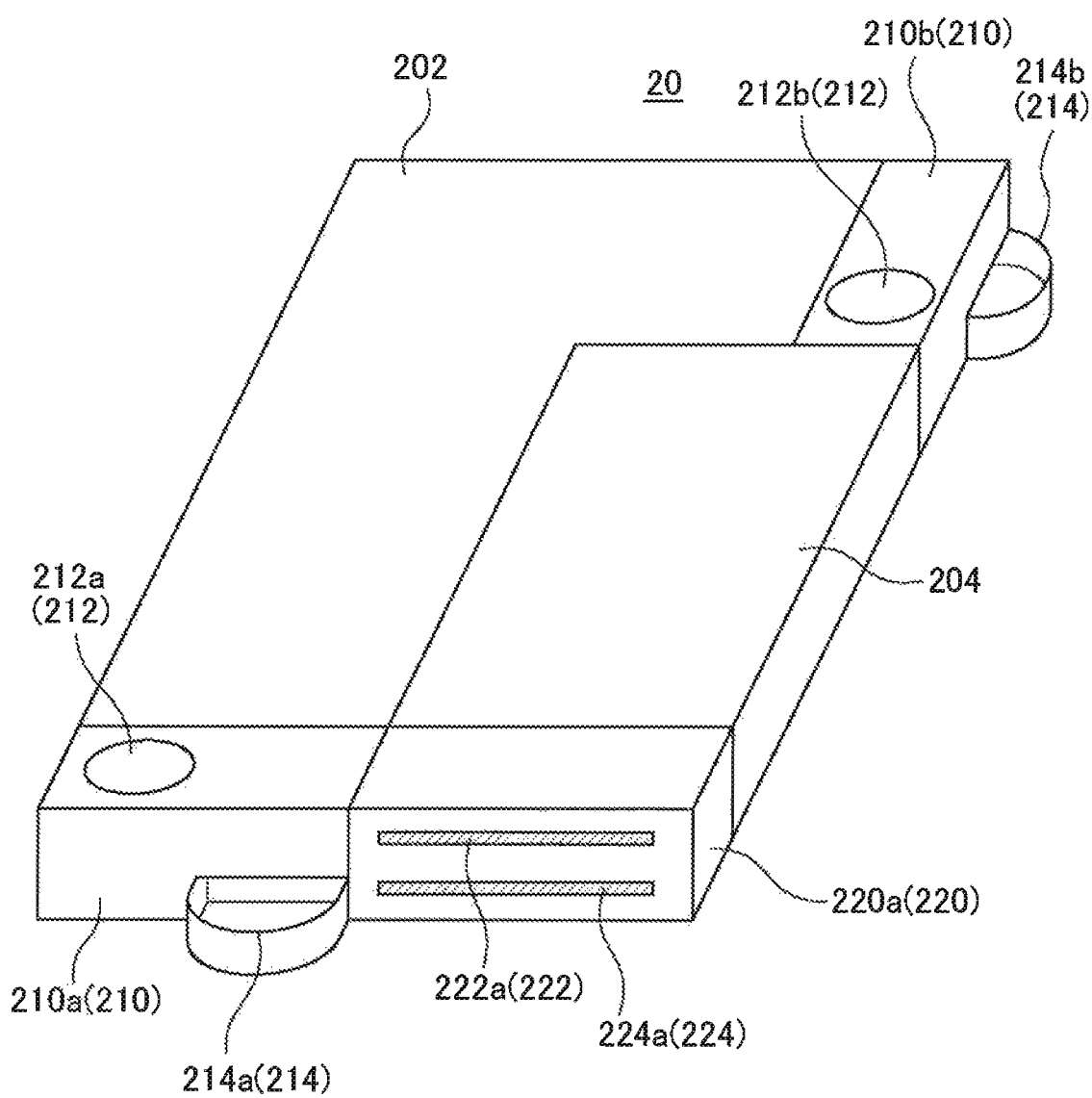
FIG. 2 is a perspective view illustrating a configuration of a settlement device illustrated in FIG. 1.

FIG. 1 is a perspective view illustrating a configuration of a POS device according to a first example embodiment. FIG. 2 is a perspective view illustrating a configuration of a settlement device (checkout machine) 20 illustrated in FIG. 1. The POS device includes a commodity registration device 10 and the settlement device 20. The commodity registration device 10 registers a commodity. The settlement device 20 settles payment for the commodity registered by the commodity registration device 10. The settlement device 20 includes a first input port 212a and a second input port 212b. Coins can be put in the first input port 212a. Coins can be put in the second input port 212b. Details will be described below.

A clerk registers a commodity by the commodity registration device 10. As described below in detail by using FIG. 3, the commodity registration device 10 registers a commodity registered in a period of time from receiving an input of information instructing start of registration to the commodity registration device 10 to receiving an input of information instructing completion of the registration to the commodity registration device 10. The commodity registration device 10 then generates settlement data about the commodity registered in the period described above and outputs the settlement data to the settlement device 20. The settlement data indicate settlement information about the registered commodity, specifically, an amount of settlement of the registered commodity.

The clerk and a customer settle payment for the commodity by the settlement device 20. The settlement data are input from the commodity registration device 10 to the settlement device 20. As described below in detail with reference to FIG. 4, the settlement device 20 calculates money put in the settlement device 20 after the settlement data are input.

Figure 3:
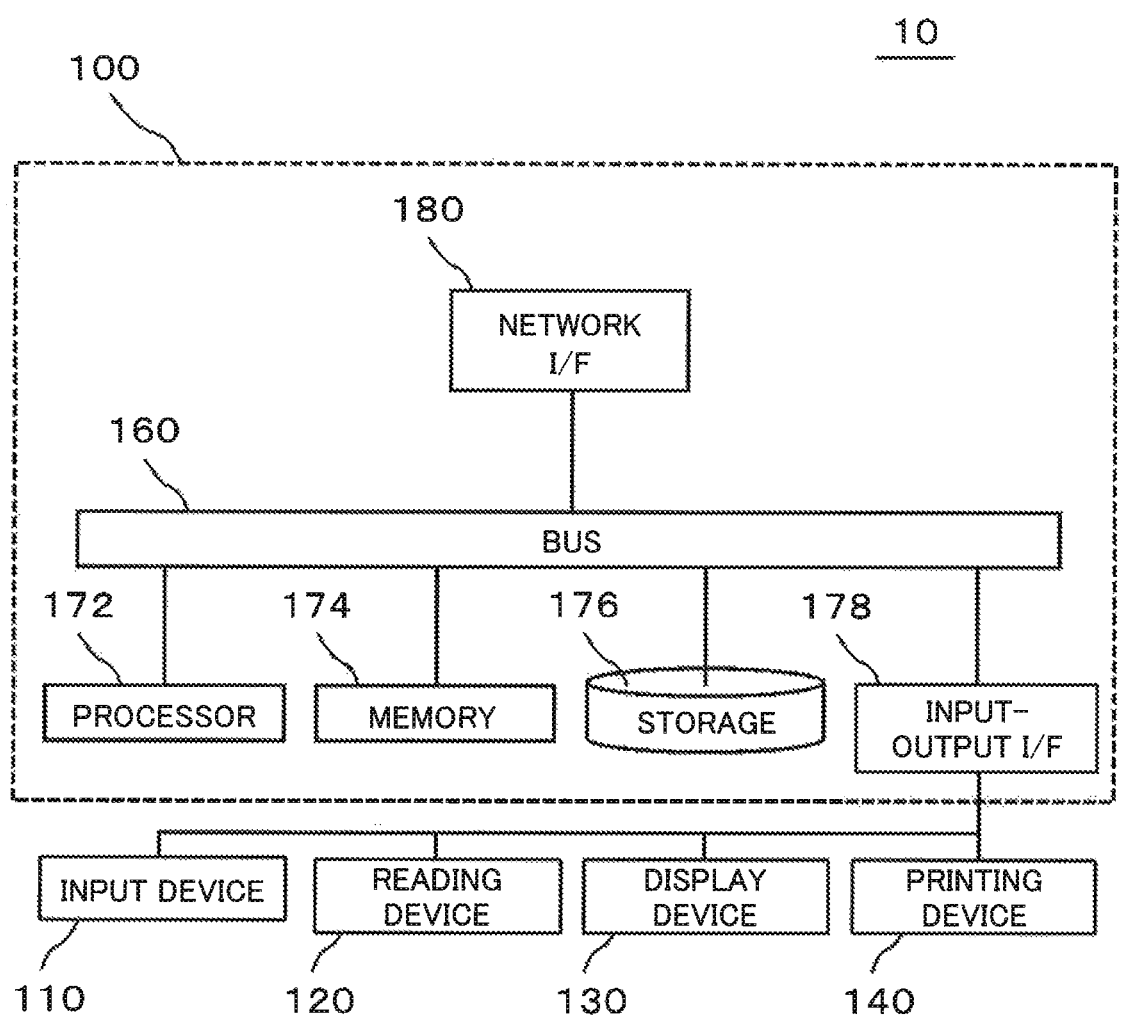
FIG. 3 is a diagram illustrating an example of a hardware configuration of a commodity registration device.

FIG. 3 is a diagram illustrating an example of a hardware configuration of the commodity registration device 10. The commodity registration device 10 includes a computer 100. The computer 100 includes a bus 160, a processor 172, a memory 174, a storage 176, an input-output interface 178, and a network interface 180. The commodity registration device 10 further includes an input device 110, a reading device 120, a display 130, and a printer 140. In the example illustrated in FIG. 3, the input device 110, the reading device 120, the display 130, and the printer 140 are provided outside the computer 100. Note that "interface" in the drawings of the present application is indicated by "I/F".

The processor 172, the memory 174, the storage 176, the input-output interface 178, and the network interface 180 are connected to one another via the bus 160. The processor 172 is a processing unit, for example, a central processing unit (CPU) or a graphics processing unit (GPU). The memory 174 is, for example, a random access memory (RAM) or a read only memory (ROM). The storage 176 is a storage device, for example, a hard disk, a solid state drive (SSD), or a memory card. The input-output interface 178 is connected to the reading device 120, the input device 110, and the display 130. The commodity registration device 10 is connected to a network interface 280 (described below with reference to FIG. 4) of the settlement device 20 via the network interface 180.

A clerk inputs information instructing start of registration to the computer 100 via the input device 110 (a keyboard or a touch panel in the example illustrated in FIG. 1). The clerk then registers a commodity in the computer 100 by using the reading device 120. In the example illustrated in FIG. 1, the reading device 120 is a scanner capable of reading a bar code. When the commodity is registered, information about the registered commodity is displayed on the display 130 (a clerk display 132 and a customer display 134 in the example illustrated in FIG. 1). The clerk then inputs information instructing completion of the registration to the computer 100 via the input device 110 when the registration of the commodity to be registered is completed. In this way, information about the commodity registered in a period of time between an input of the information instructing the start of the registration and an input of the information instructing the completion of the registration is input to the computer 100. The printer 140 (a printer in the example illustrated in FIG. 1) issues a receipt after the settlement is completed.

The computer 100 generates settlement data using the above-described information about the commodity registered in the period. Specifically, the storage 176 stores a program module for generating settlement data. The processor 172 reads this program module to the memory 174 and then executes this program module. Note that the processor 172 may execute the above-described program module without reading the program module to the memory 174.

The settlement data are output to the settlement device 20 (described below in detail with reference to FIG. 4) via the network interface 180.

Figure 4:
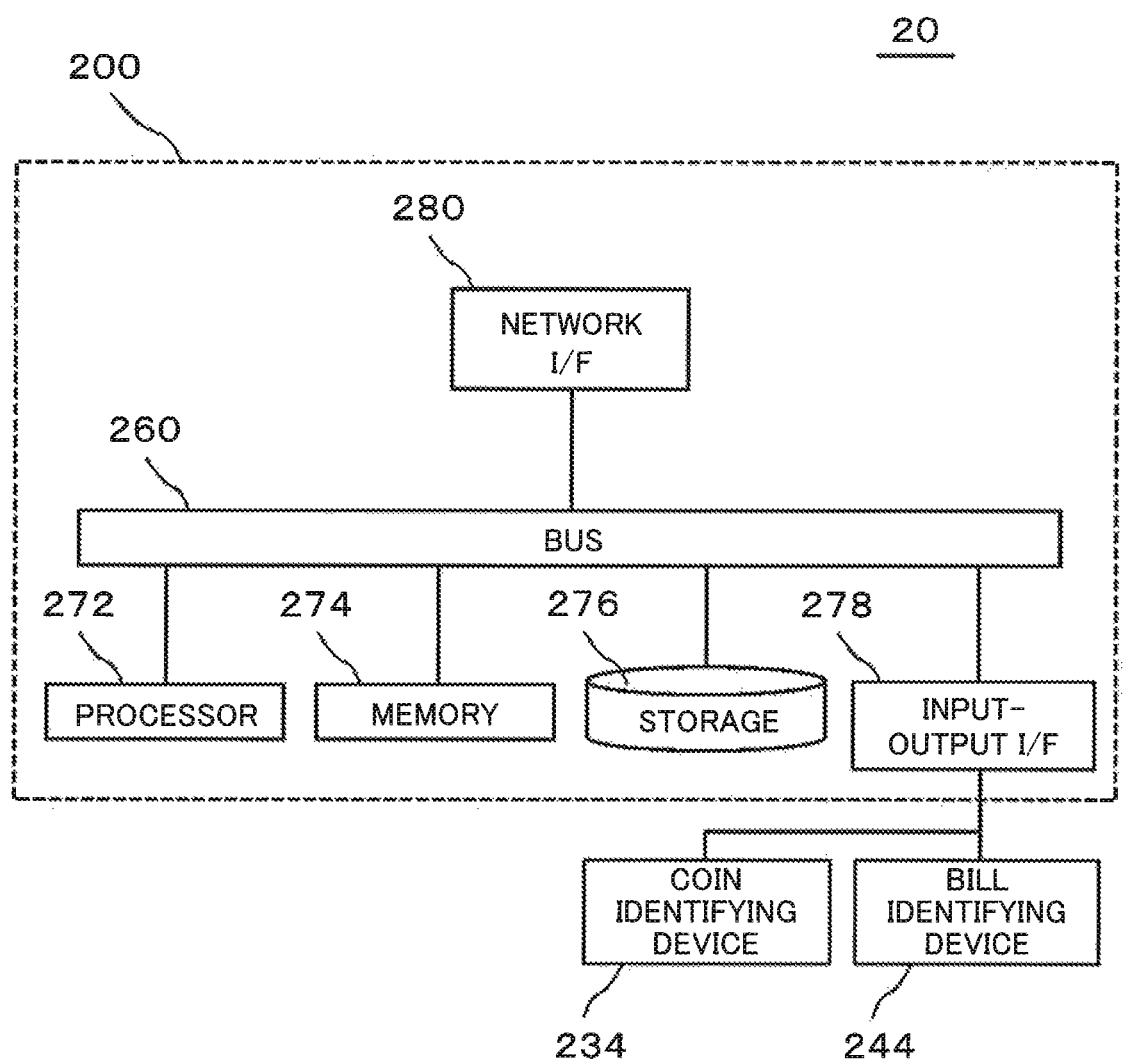
FIG. 4 is a diagram illustrating an example of a hardware configuration of the settlement device.

FIG. 4 is a diagram illustrating an example of a hardware configuration of the settlement device 20. The settlement device 20 includes a computer 200. The computer 200 includes a bus 260, a processor 272, a memory 274, a storage 276, an input-output interface 278, and a network interface 280. The settlement device 20 further includes a coin validator 234 and a bill validator 244. In the example illustrated in FIG. 4, the coin validator 234 and the bill validator 244 are provided outside the computer 200.

The processor 272, the memory 274, the storage 276, the input-output interface 278, and the network interface 280 are connected to one another via the bus 260. The processor 272 is a processing unit, for example, a CPU or a GPU. The memory 274 is, for example, a RAM or a ROM. The storage 276 is a storage device, for example, a hard disk, a SSD, or a memory card. The input-output interface 278 is connected to the coin validator 234 and the bill validator 244. The settlement device 20 is connected to the network interface 180 (FIG. 3) of the commodity registration device 10 via the network interface 280.

When settlement data are input, the settlement device 20 starts settlement. Specifically, the settlement device 20 calculates money put in the settlement device 20 after the settlement data are input. Specifically, the storage 276 stores a program module (function of a coin calculating unit 252 (described below with reference to FIGS. 5 and 6) and function of a bill calculating unit 254 (described below with reference to FIGS. 11 and 12)) for calculating the money. The processor 272 reads this program module to the memory 274 and executes this program module. Note that the processor 272 may execute the above-described program module without reading the program module to the memory 274.

A clerk inputs an input signal to the settlement device 20 via an input unit (for example, the input device 110 (FIG. 3) of the commodity registration device 10), and thereby, the settlement device 20 may calculate money put in the settlement device 20 before settlement data are input. In this way, as described below, a customer can put coins in the second input port 212b (FIGS. 1 and 2) before registration of a commodity is completed.

Return to FIGS. 1 and 2. The settlement device 20 includes a coin case 202, a bill case 204, a coin unit 210 (a first unit 210a and a second unit 210b), and a bill unit 220 (a first unit 220a). The coin case 202 can house coins. The bill case 204 can house bills. The coin unit 210 is provided outside the coin case 202. The bill unit 220 is provided outside the bill case 204.

A coin input port 212 is formed in the coin unit 210. A bill input port 222 is formed in the bill unit 220. The coin unit 210 includes a path (a coin path 232 illustrated in each of FIGS. 5 and 6 (described below in detail)) connected from the coin input port 212 to a space inside the coin case 202. The bill unit 220 includes a path (a bill path 242 illustrated in each of FIGS. 11 and 12 (described below in detail)) connected from the bill input port 222 to a space inside the bill case 204. In this way, coins can be put from the coin input port 212 into the inside of the coin case 202. Similarly, bills can be put from the bill input port 222 into the inside of the bill case 204.

In the example illustrated in FIGS. 1 and 2, the coin input port 212 faces upward in a vertical direction and the bill input port 222 faces in a horizontal direction. However, the direction in which the coin input port 212 faces and the direction in which the bill input port 222 faces are not limited to the example illustrated in FIGS. 1 and 2. For example, the direction in which the coin input port 212 faces may be a direction inclined from the vertical direction toward the outside of the coin case 202 or may be a horizontal direction toward the outside of the coin case 202. Furthermore, for example, the direction in which the bill input port 222 faces may be an upward direction in the vertical direction or may be a direction inclined from the vertical direction toward the outside of the bill case 204.

A coin dispensing port 214 is further formed in the coin unit 210. A bill payment port 224 is formed in the bill unit 220. The coin unit 210 includes a path connected from the space inside the coin case 202 to the coin dispensing port 214. The bill unit 220 includes a path connected from the space inside the bill case 204 to the bill payment port 224. In this way, coins can be dispensed from the inside of the coin case 202 to the coin dispensing port 214. Similarly, bills can be dispensed from the inside of the bill case 204 to the bill payment port 224.

The bill case 204 has a shape extending in a first direction. The first unit 220a is formed at one end of the bill case 204. The coin case 202 has a first end portion that faces in the first direction and a second end portion that faces in a second direction (orthogonal to the first direction in the example illustrated in FIGS. 1 and 2) intersecting the first direction. The coin case 202 has a shape extending along side surfaces of the bill case 204 from the first end portion toward the second end portion. The first unit 210a is formed at the first end portion of the coin case 202. The second unit 210b is formed at the second end portion of the coin case 202.

Both of the first unit 210a and the first unit 220a face in the same direction (first direction). Furthermore, the clerk display 132 of the commodity registration device 10 also faces in the first direction. In this way, a clerk using the POS device can use the first unit 210a and the first unit 220a from the first direction and can also look at the clerk display 132 from the first direction.

The second unit 210b faces in the second direction. Furthermore, the customer display 134 of the commodity registration device 10 also faces in the second direction. In this way, a customer using the POS device can use the second unit 210b from the second direction and can also look at the customer display 134 from the second direction.

In the example illustrated in FIGS. 1 and 2, the first direction (direction in which the first unit 210a and the first unit 220a face) is different from the second direction (direction in which the second unit 210b faces) by 90 degrees. However, the difference between the first direction and the second direction is not limited to the example illustrated in FIGS. 1 and 2. For example, the difference between the first direction and the second direction may be greater than or equal to 60 degrees and less than or equal to 120 degrees.

Figure 5:
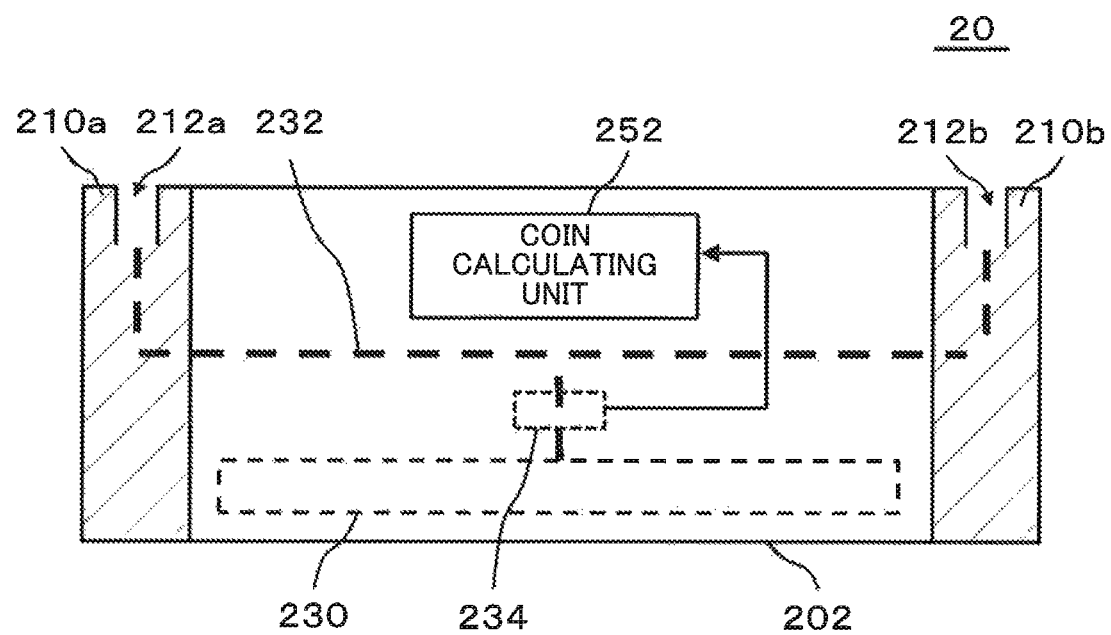
FIG. 5 is a diagram for describing a first example of an internal structure of the settlement device illustrated in FIG. 2.

FIG. 5 is a diagram for describing a first example of an internal structure of the settlement device 20 illustrated in FIG. 2. In the example illustrated in FIG. 5, the settlement device 20 includes a coin housing unit 230, the coin path 232, the coin validator 234, and the coin calculating unit 252.

The coin housing unit 230 is housed inside the coin case 202. The coin housing unit 230 is connected to the first input port 212a and the second input port 212b through the coin path 232. In this way, coins put from the first input port 212a and coins put from the second input port 212b are housed in the same coin housing unit 230.

The coin validator 234 is provided in the coin path 232. The coin validator 234 validates a kind of coins and is formed by using, for example, an optical sensor. In the example illustrated in FIG. 5, both of coins put from the first input port 212a and coins put from the second input port 212b pass through the same coin validator 234. A signal indicating a validation result of the coin validator 234 is transmitted to the coin calculating unit 252. The coin calculating unit 252 calculates a total amount of the coins put in the first input port 212a and the coins put in the second input port 212b on the basis of the validation result of the coin validator 234.

Figure 6:
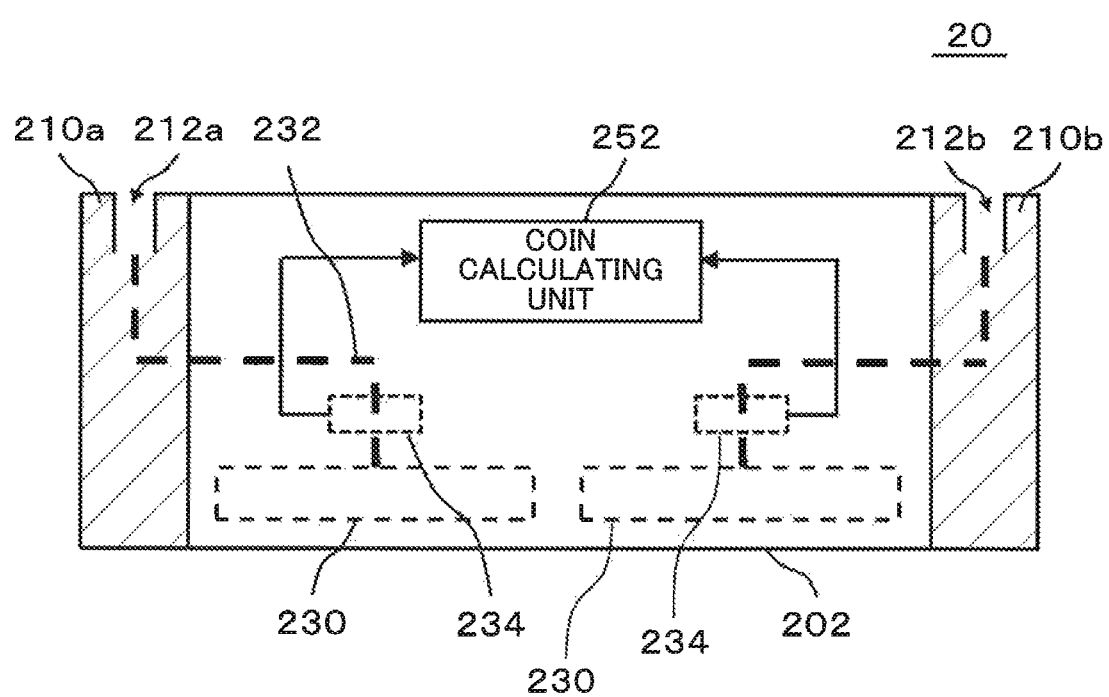
FIG. 6 is a diagram for describing a second example of the internal structure of the settlement device illustrated in FIG. 2.

FIG. 6 is a diagram for describing a second example of the internal structure of the settlement device 20 illustrated in FIG. 2. The settlement device 20 illustrated in FIG. 6 has the same configuration as that of the settlement device 20 illustrated in FIG. 5 except for the following points.

In the example illustrated in FIG. 6, a plurality of coin housing units 230 are housed inside the coin case 202. The first input port 212a and the second input port 212b are connected to the coin housing units 230 different from each other. In this way, coins put from the first input port 212a and coins put from the second input port 212b are housed in the coin housing units 230 different from each other.

In the example illustrated in FIG. 6, coins put from the first input port 212a and coins put from the second input port 212b pass through coin validators 234 different from each other. Also in this case, the coin calculating unit 252 (totaling means) can add up an amount of the coins put from the first input port 212a and an amount of the coins put from the second input port 212b on the basis of a validation result of each of a plurality of the coin validators 234.

Next, a method for using the POS device according to the present example embodiment is described by using FIG. 1. In this POS device, the first unit 210a and the second unit 210b face in directions different from each other. When the POS device is used, a clerk is positioned in front of the first unit 210a while a customer is positioned in front of the second unit 210b. In this case, the first input port 212a and a first input port 222a face a clerk side and form at least a part of a user interface designed for a clerk. The second input port 212b faces a customer side and forms at least a part of a user interface designed for a customer. In this way, the customer can pay money by giving the money to the clerk and can also pay the money by putting the money (coin) in the second input port 212b of the second unit 210b. In other words, the first input port 212a and the second input port 212b are disposed operably from different directions. For the money given to the clerk, coins is put in the first input port 212a of the first unit 210a and bills is put in the first input port 222a of the first unit 220a.

Furthermore, this POS device can dispense change (coin) from both of a first dispensing port 214a and a second dispensing port 214b. In this way, the clerk can return the change to the customer by giving the change dispensed from the first dispensing port 214a to the customer and can also return the change to the customer by dispensing the change from the second dispensing port 214b. Note that whether the change is dispensed from the first dispensing port 214a or the second dispensing port 214b can be determined on the basis of, for example, an input signal input via the input device 110.

Furthermore, this POS device allows a customer to put money (coin) in the second input port 212b of the second unit 210b before a clerk completes registration of a commodity. In this case, if a settlement amount is confirmed and an amount put in by the customer is lower than the settlement amount, a balance due is displayed on, for example, the customer display 134. In this way, as described above, the customer can pay the balance due. On the other hand, when an amount put in by a customer is greater than a settlement amount of a commodity, change can return to the customer as described above.

As described above, according to the present example embodiment, the first unit 210a and the second unit 210b face in directions different from each other. In this way, the first unit 210a can be faced to the clerk side while the second unit 210b can be faced to the customer side. This allows a clerk to put money (coin) in the first input port 212a of the first unit 210a. A customer can put money (coin) in the second input port 212b of the second unit 210b.

Note that the number of the coin input ports 212 is not limited to the example (two) illustrated in FIG. 1. The number of the coin input ports 212 may be three or more. In this case, for example, the coin input port 212 is formed in each of a plurality of the coin units 210. Thus, a plurality of the coin units 210 face in directions different from each other.

Furthermore, both of coins and bills (namely, currencies) may be put in the coin input port 212 (the first input port 212a and the second input port 212b). Furthermore, both of coins and bills (namely, currencies) may be dispensed from the coin dispensing port 214 (the first dispensing port 214a and the second dispensing port 214b).

Furthermore, the POS device may not include the commodity registration device 10.

In PTL 1, the settlement device is faced to each of the clerk side and the customer side by rotating the settlement device. Such a POS device needs a mechanism for rotating the settlement device. In contrast, the present example embodiment allows both of a clerk and a customer to pay money in the settlement device 20 without providing such a mechanism.

In PTLs 2 and 3, only one coin input port is provided in the settlement device. Such a settlement device allows coins to be put in the coin input port from only one direction. Thus, it is substantially impossible for a clerk and a customer to put coins in the coin input port at the same time. In contrast, a plurality of the coin input ports 212 are formed in the present example embodiment. Thus, a clerk and a customer can put coins in the settlement device 20 at the same time by using the coin input ports 212 different from each other.

In PTL 4, a device that allows a customer to pay an approximate amount and a device that allows the customer to process a difference between an accurate amount of a commodity and the approximate amount are located away from each other. Thus, the customer needs to move from the former device to the latter device. In contrast, even in a case where, for example, a customer pays an approximate amount before the commodity registration device 10 completes registration of a commodity and then processes a difference between an accurate amount of the commodity and the approximate amount, the present example embodiment allows the customer to perform these processes by the one settlement device 20. This case eliminates a need for the customer to move between these processes.

Figure 7:
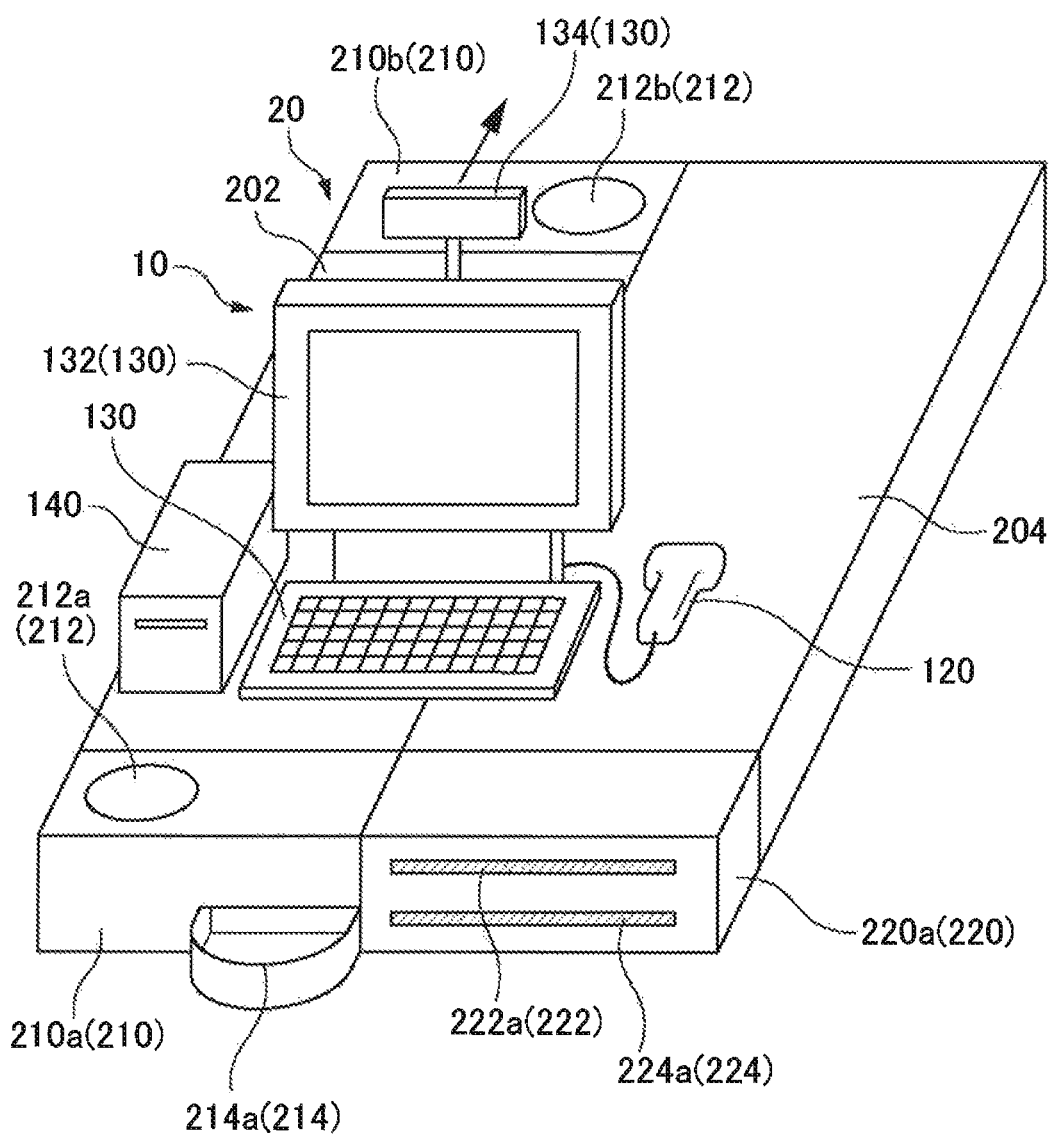
FIG. 7 is a perspective view illustrating a modification example of FIG. 1.
Figure 8:
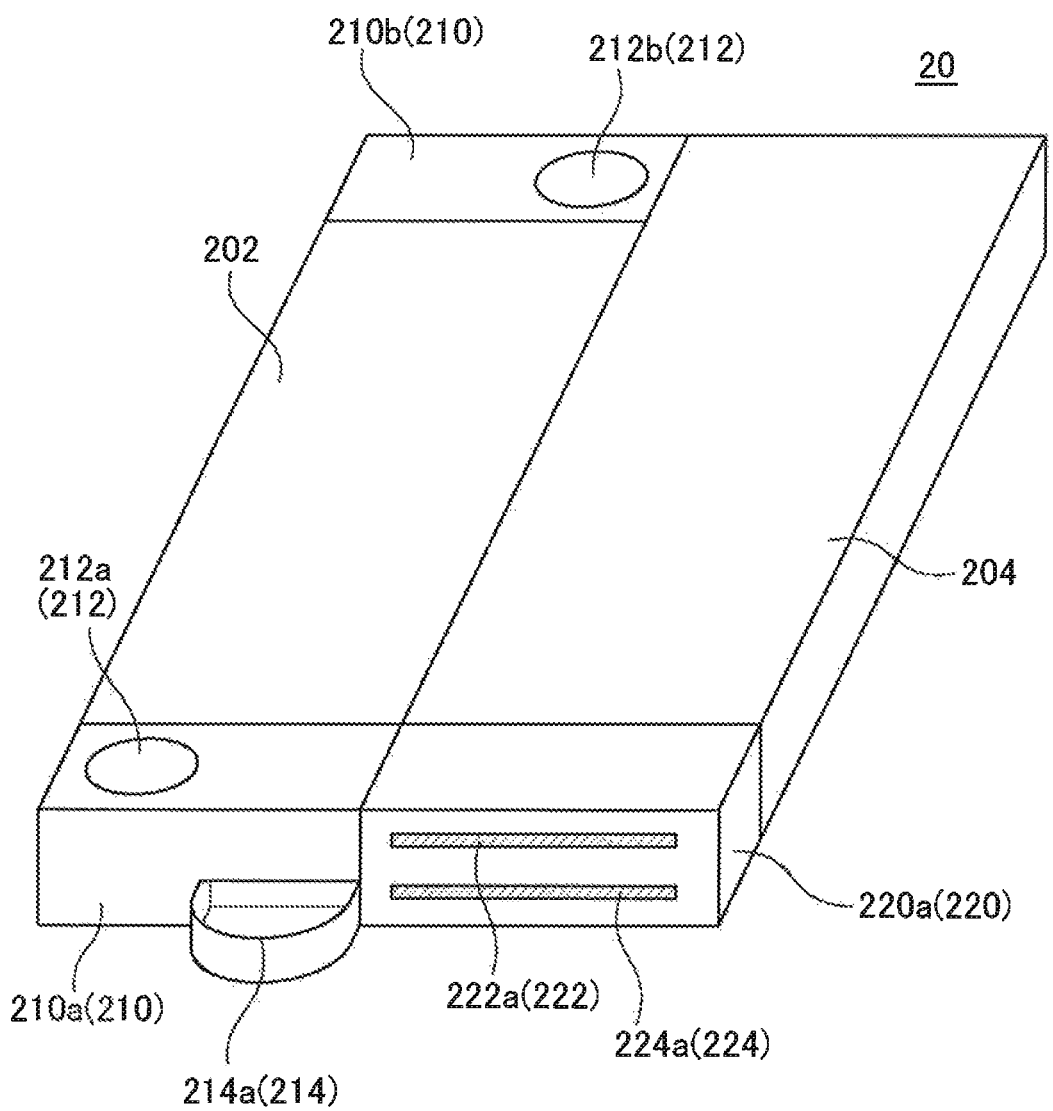
FIG. 8 is a perspective view illustrating a configuration of the settlement device illustrated in FIG. 7.
Figure 9:
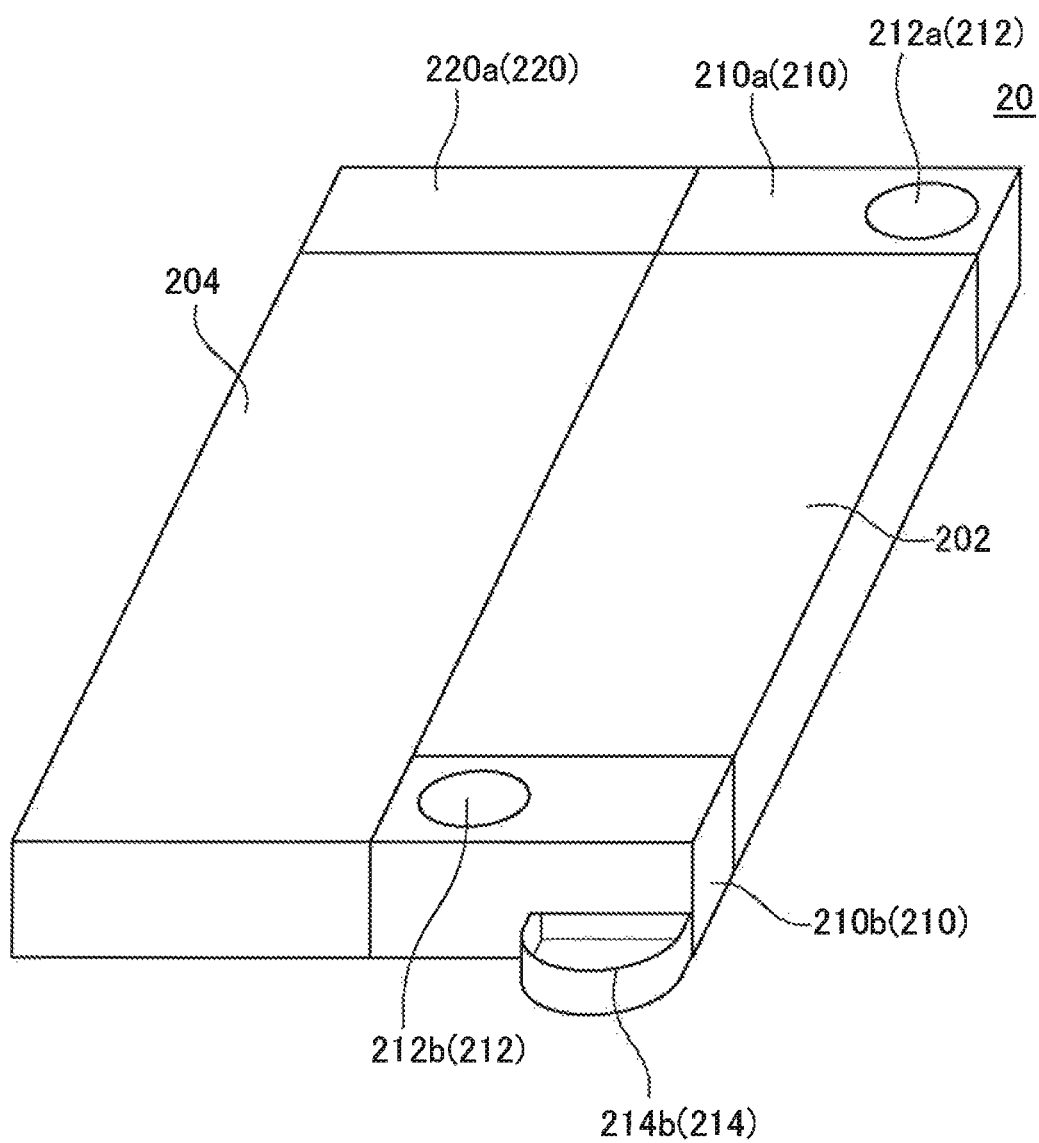

FIG. 7 is a perspective view illustrating a modification example of FIG. 1. FIG. 8 is a perspective view illustrating a configuration of the settlement device 20 illustrated in FIG. 7 and corresponding to FIG. 2 in the present example embodiment. FIG. 9 is a perspective view of the settlement device 20 illustrated in FIG. 8 as seen from an opposite side. The POS device according to the present modification example has the same configuration as that of the POS device according to the present example embodiment except for the following points.

In the example illustrated in FIGS. 7 to 9, both of the coin case 202 and the bill case 204 form a shape extending in the same direction. The first unit 210a is attached to one end of the coin case 202. The first unit 220a is attached to one end of the bill case 204. The first unit 210a and the first unit 220a face in the same direction (first direction). Furthermore, the clerk display 132 of the commodity registration device 10 also faces in the first direction. In this way, a clerk using the POS device can use the first unit 210a and the first unit 220a from the first direction and can also look at the clerk display 132 from the first direction.

The second unit 210b is attached to another end of the coin case 202. In this way, the second unit 210b faces in an opposite direction (second direction) to the first direction (direction in which the first unit 210a and the first unit 220a face). Furthermore, the customer display 134 of the commodity registration device 10 also faces in the second direction. In this way, a customer using the POS device can use the second unit 210b from the second direction and can also look at the customer display 134 from the second direction.

In the example illustrated in FIGS. 7 to 9, the clerk and the customer can use the POS device while facing each other with the commodity registration device 10 and the settlement device 20 therebetween.

Second Example Embodiment

Figure 10:
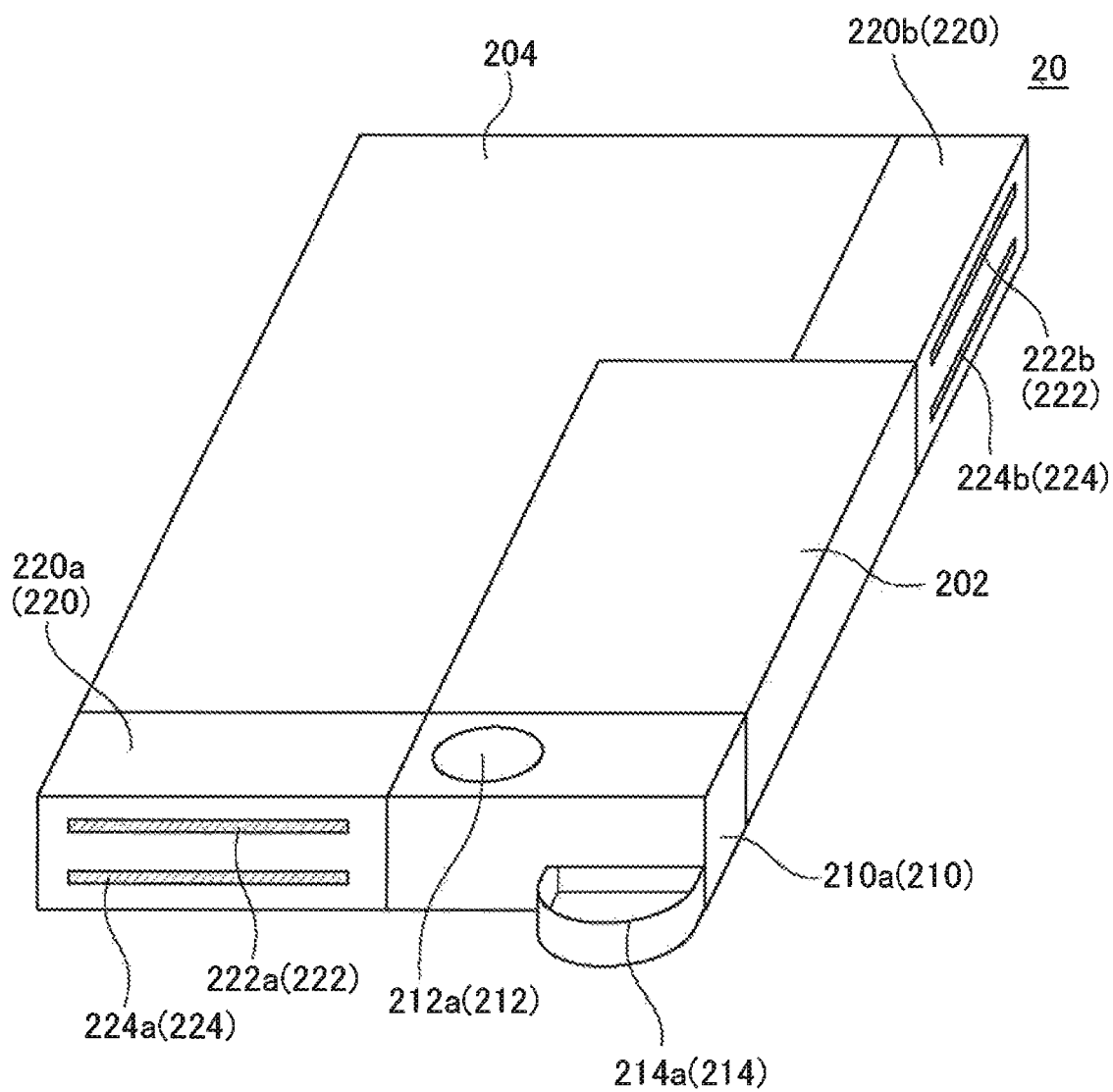
FIG. 10 is a perspective view illustrating a configuration of a settlement device used for a POS device according to a second example embodiment.

FIG. 10 is a perspective view illustrating a configuration of a settlement device 20 used for a POS device according to a second example embodiment and corresponding to FIG. 2 in the first example embodiment. The POS device according to the present example embodiment has the same configuration as that of the POS device according to the first example embodiment except for the following points.

The settlement device 20 includes a coin case 202, a bill case 204, a coin unit 210 (a first unit 210a), and a bill unit 220 (a first unit 220a and a second unit 220b). A first input port 222a and a first dispensing port 224a are formed in the first unit 220a. A second input port 222b and a second dispensing port 224b are formed in the second unit 220b. The first unit 210a and the first unit 220a face in a first direction. The second unit 220b faces in a second direction (orthogonal to the first direction in the example illustrated in FIG. 10) intersecting the first direction.

Figure 11:
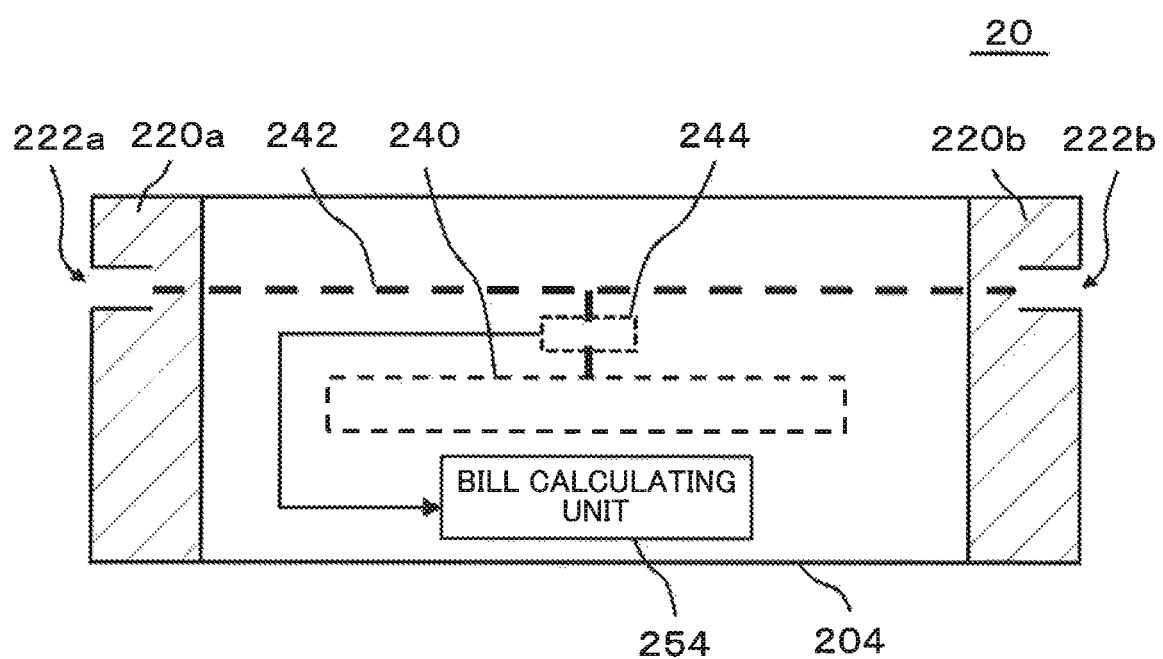
FIG. 11 is a diagram for describing a first example of an internal structure of the settlement device illustrated in FIG. 10.

FIG. 11 is a diagram for describing a first example of an internal structure of the settlement device 20 illustrated in FIG. 10. In the example illustrated in FIG. 11, the settlement device 20 includes a bill housing unit 240, a bill path 242, a bill validator 244, and a bill calculating unit 254.

The bill housing unit 240 is housed inside the bill case 204. The bill housing unit 240 is connected to the first input port 222a and the second input port 222b through the bill path 242. In this way, bills put from the first input port 222a and bills put from the second input port 222b are housed in the same bill housing unit 240.

The bill validator 244 is provided in the bill path 242. The bill validator 244 validates a kind of bills and is formed by using, for example, an optical sensor. In the example illustrated in FIG. 11, both of bills put from the first input port 222a and bills put from the second input port 222b pass through the same bill validator 244. A signal indicating a validation result of the bill validator 244 is transmitted to the bill calculating unit 254. The bill calculating unit 254 calculates a total amount of the bills put in the first input port 222a and the bills put in the second input port 222b on the basis of the validation result of the bill validator 244.

Figure 12:
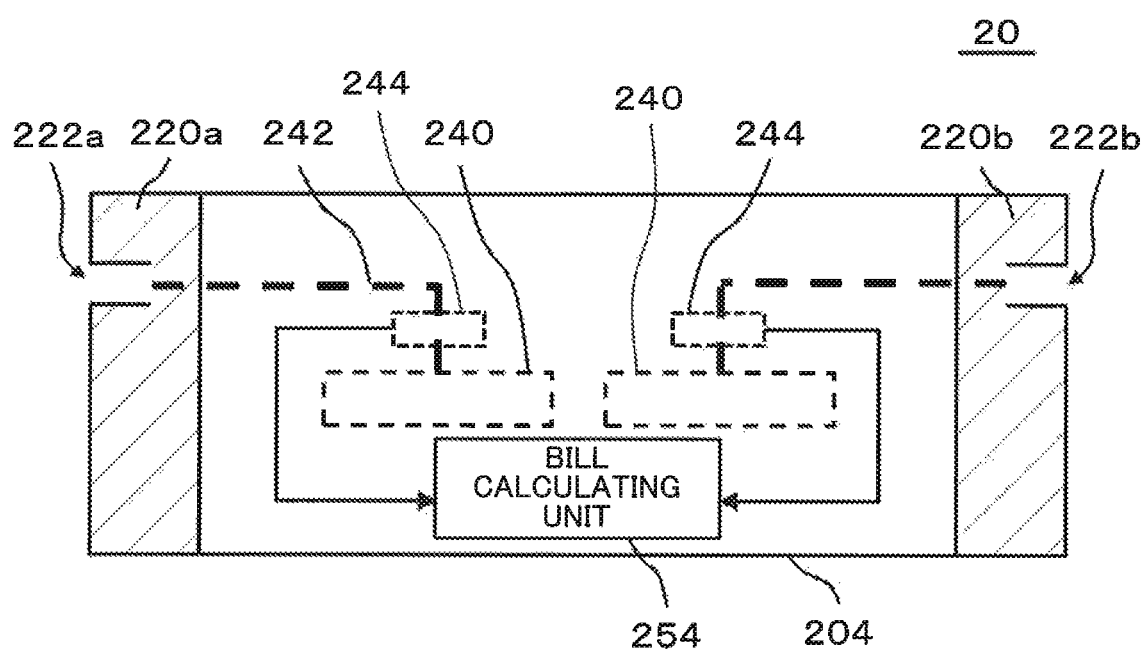
FIG. 12 is a diagram for describing a second example of the internal structure of the settlement device illustrated in FIG. 10.

FIG. 12 is a diagram for describing a second example of the internal structure of the settlement device 20 illustrated in FIG. 10. The settlement device 20 illustrated in FIG. 12 has the same configuration as that of the settlement device 20 illustrated in FIG. 11 except for the following points.

In the example illustrated in FIG. 12, a plurality of bill housing units 240 are housed inside the bill case 204. The first input port 222a and the second input port 222b are connected to the bill housing units 240 different from each other. In this way, bills put from the first input port 222a and coins put from the second input port 222b are housed in the bill housing units 240 different from each other.

In the example illustrated in FIG. 12, bills put from the first input port 222a and bills put from the second input port 222b pass through bill validators 244 different from each other. Also in this case, the bill calculating unit 254 (totaling means) can add up an amount of the bills put from the first input port 222a and an amount of the bills put from the second input port 222b on the basis of a validation result of each of the plurality of bill validators 244.

Next, a method for using the POS device according to the present example embodiment is described by using FIG. 10. This POS device allows a customer to pay money by giving the money to a clerk and also allows the customer to pay money (bill) by putting the money in the second input port 222b of the second unit 220b. In this case, the money (bill) given to the clerk can be put in the first input port 222a of the first unit 220a. In this way, the first input port 222a and the second input port 222b are disposed operably from different directions. Furthermore, this POS device can dispense change (bill) from both of the first dispensing port 224a and the second dispensing port 224b. Note that whether the change is dispensed from the first dispensing port 224a or the second dispensing port 224b can be determined on the basis of, for example, an input signal input via an input device 110.

Both of coins and bills (namely, currencies) may be put in a bill input port 222 (the first input port 222a and the second input port 222b). Furthermore, both of coins and bills (namely, currencies) may be dispensed from a bill payment port 224 (the first dispensing port 224a and the second dispensing port 224b).

Figure 13:
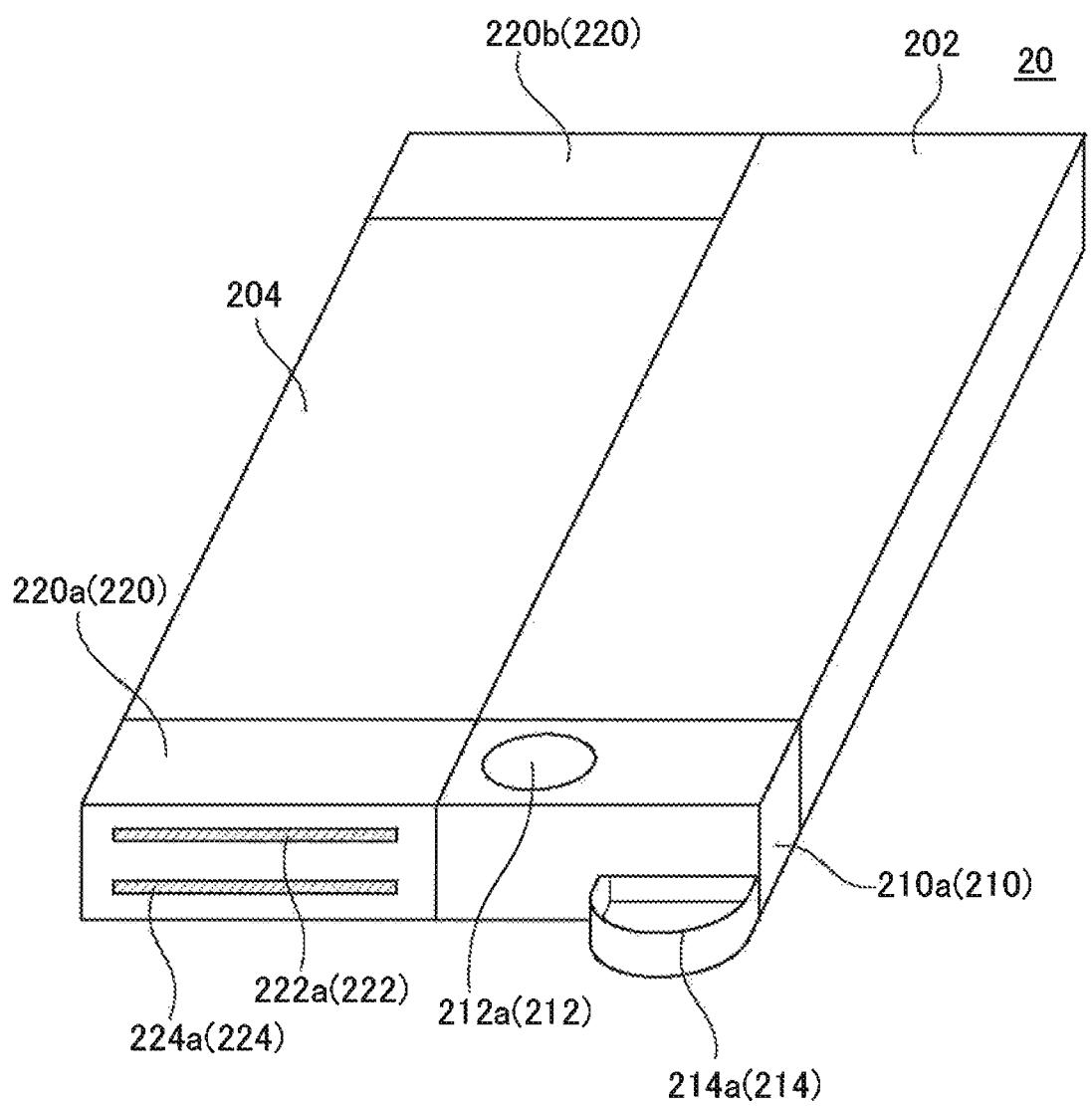
FIG. 13 is a diagram illustrating a modification example of FIG. 10.
Figure 14:
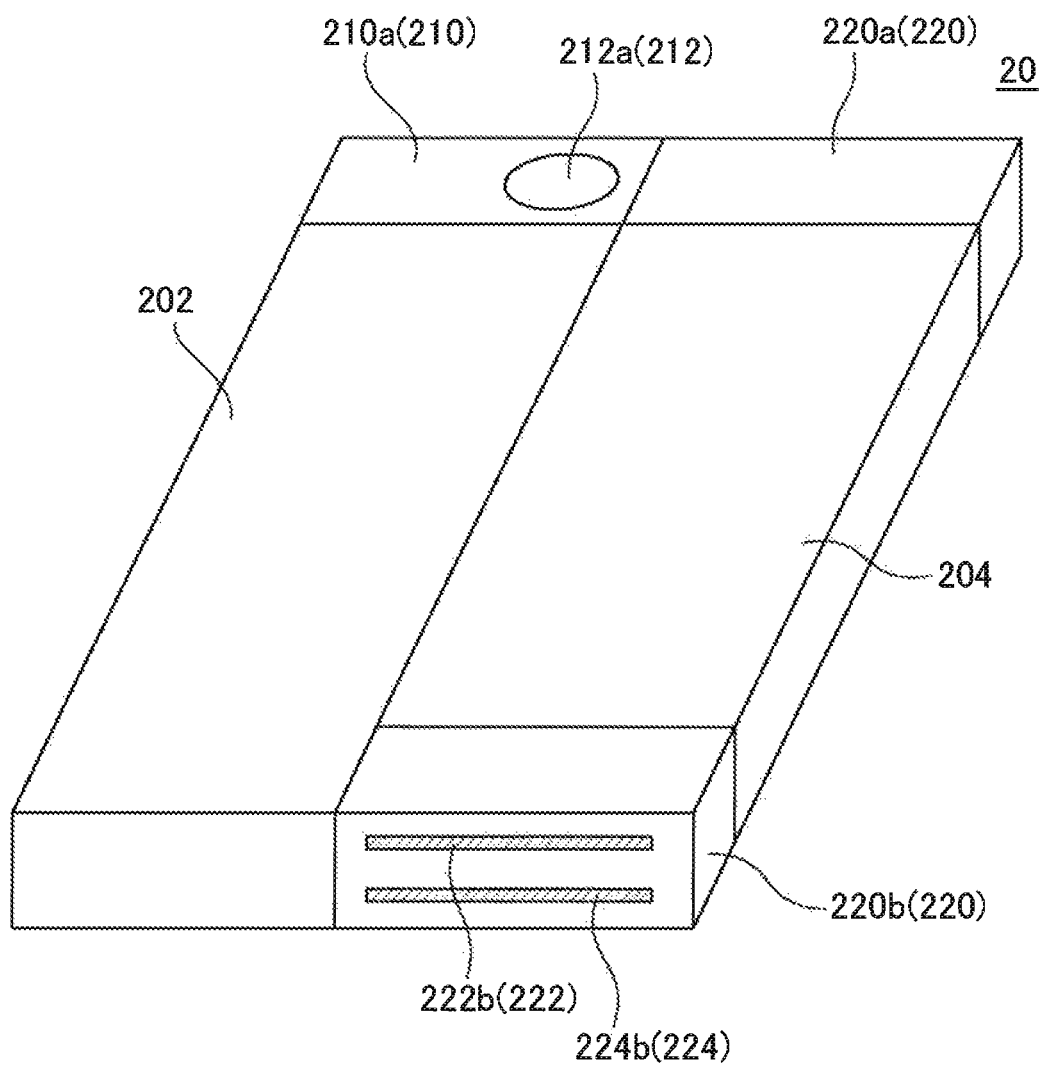
FIG. 14 is a perspective view of the settlement device illustrated in FIG. 13 as seen from an opposite side.

FIG. 13 is a diagram illustrating a modification example of FIG. 10. FIG. 14 is a perspective view of the settlement device 20 illustrated in FIG. 13 as seen from an opposite side. As illustrated in FIGS. 13 and 14, the second unit 220b may face opposite to the first unit 210a and the first unit 220a. In this way, a clerk and a customer can use the POS device while facing each other with the commodity registration device 10 and the settlement device 20 therebetween.

Third Example Embodiment

Figure 15:
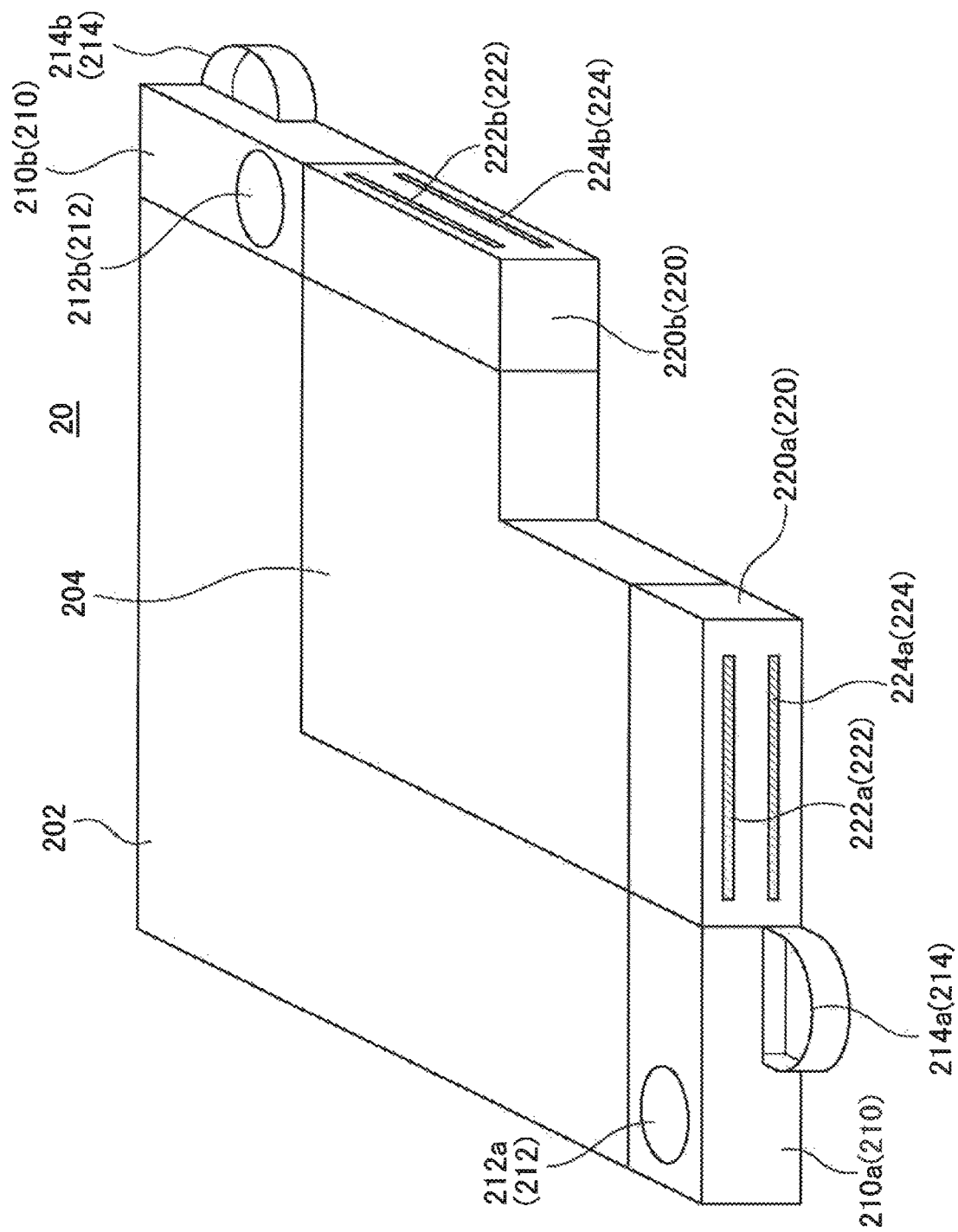
FIG. 15 is a perspective view illustrating a configuration of a settlement device used for a POS device according to a third example embodiment.

FIG. 15 is a perspective view illustrating a configuration of a settlement device 20 used for a POS device according to a third example embodiment and corresponding to FIG. 2 in the first example embodiment. The POS device according to the present example embodiment has the same configuration as that of the POS device according to the first example embodiment except for the following points.

In the example illustrated in FIG. 15, the settlement device 20 includes a coin case 202, a bill case 204, a coin unit 210 (a first unit 210a and a second unit 210b), and a bill unit 220 (a first unit 220a and a second unit 220b). The first unit 210a and the first unit 220a face in a first direction. The second unit 210b and the second unit 220b face in a second direction (orthogonal to the first direction in the example illustrated in FIG. 15) intersecting the first direction.

This POS device allows a customer to pay money by giving the money to a clerk and also allows the customer to pay the money by putting coins and bills in the second input port 212b of the second unit 210b and the second input port 222b of the second unit 220b, respectively. Furthermore, this POS device can dispense coins in change from both of a first dispensing port 214a and a second dispensing port 214b and can dispense bills in change from both of a first dispensing port 224a and a second dispensing port 224b. Note that whether the coins in change is dispensed from the first dispensing port 214a or the second dispensing port 214b and whether the bills in change is dispensed from the first dispensing port 224a or the second dispensing port 224b can be determined on the basis of, for example, an input signal input via an input device 110.

Figure 16:
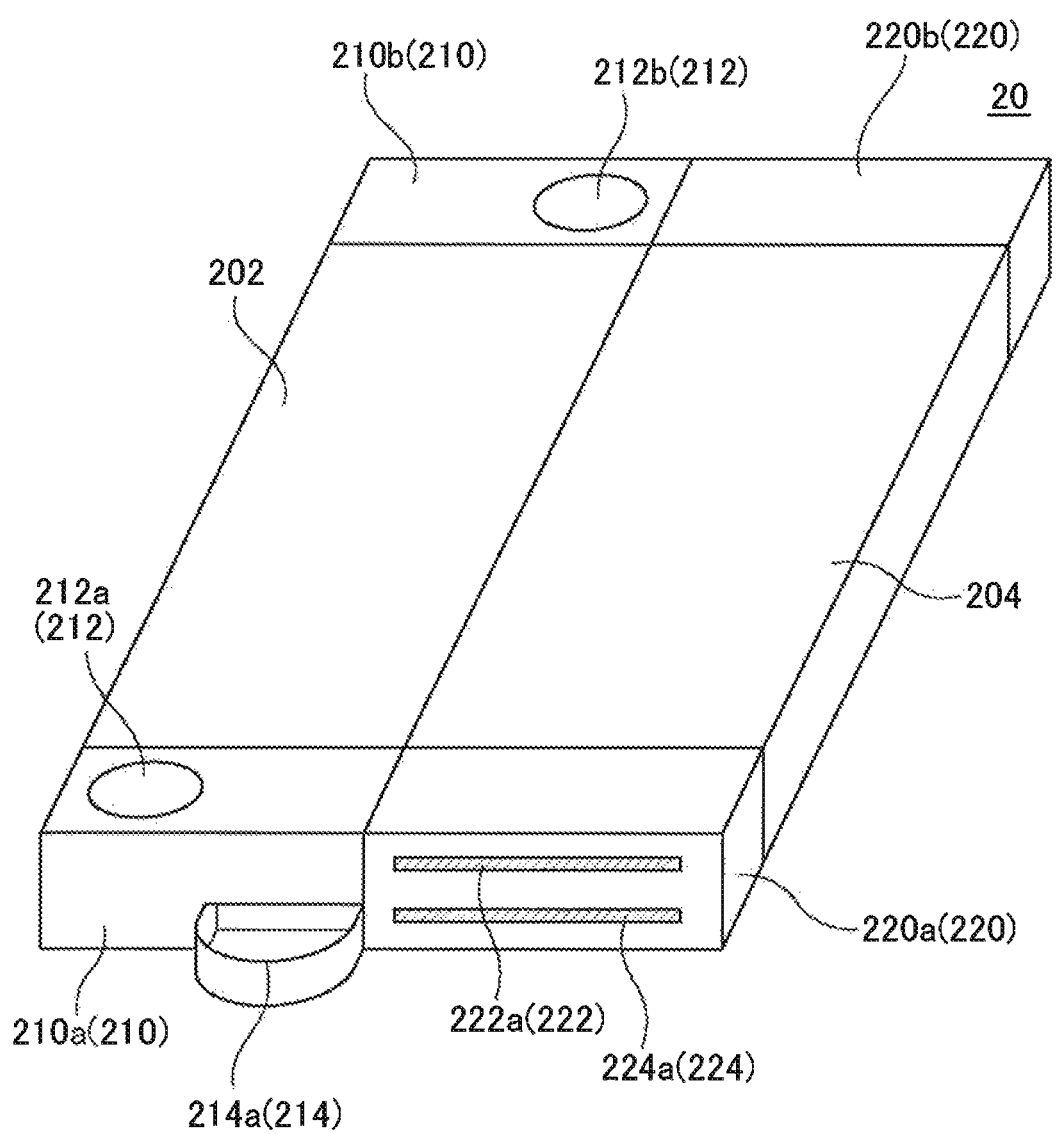
FIG. 16 is a diagram illustrating a modification example of FIG. 15.
Figure 17:
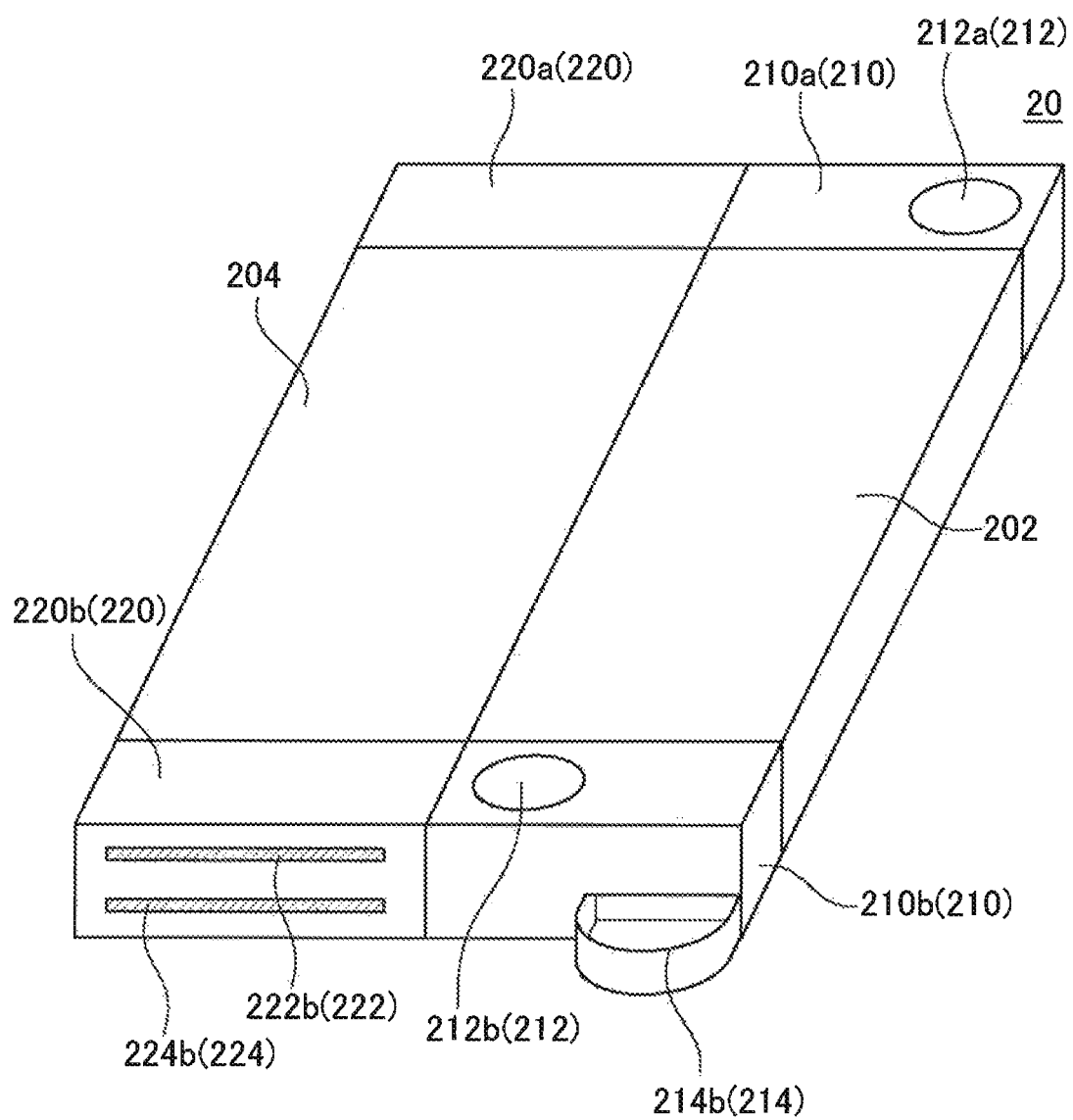
FIG. 17 is a perspective view of the settlement device illustrated in FIG. 16 as seen from an opposite side.

FIG. 16 is a diagram illustrating a modification example of FIG. 15. FIG. 17 is a perspective view of the settlement device 20 illustrated in FIG. 16 as seen from an opposite side. As illustrated in FIGS. 16 and 17, the second unit 210b and the second unit 220b may face opposite to the first unit 210a and the first unit 220a. In this way, in the example illustrated in FIGS. 16 and 17, a clerk and a customer can use the POS device while facing each other with the commodity registration device 10 and the settlement device 20 therebetween.

Fourth Example Embodiment

Figure 18:
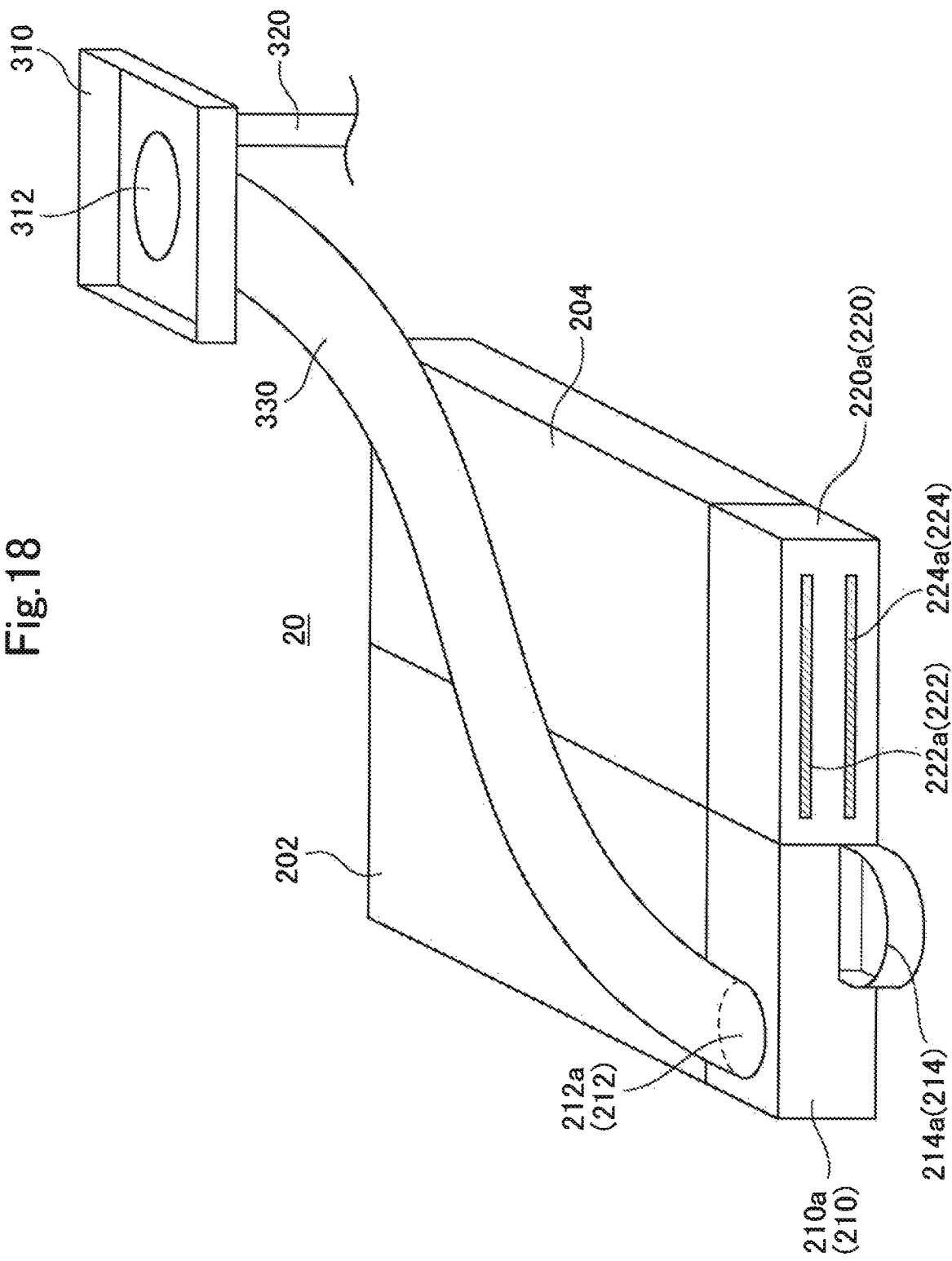
FIG. 18 is a perspective view illustrating a configuration of a POS device according to a fourth example embodiment.

FIG. 18 is a perspective view illustrating a configuration of a POS device according to a fourth example embodiment and corresponding to FIG. 1 in the first example embodiment. The POS device according to the present example embodiment has the same configuration as that of the POS device according to the first example embodiment except for the following points.

In the example illustrated in FIG. 18, only a first unit 210a is formed in a coin case 202, but a second unit 210b (for example, FIG. 1) is not formed therein. Only a first unit 220a is formed in a bill case 204, but a second unit 220b (for example, FIG. 17) is not formed therein. The first unit 210a and the first unit 220a face in the same direction and face, for example, a clerk side.

A base 310 is provided in a position away from the settlement device 20. In the example illustrated in FIG. 18, the base 310 is supported by a support unit 320. An opening 312 is formed in the base 310. The opening 312 of the base 310 is coupled to a first input port 212a of the settlement device 20 through a coupling unit 330. The coupling unit 330 is hollow. Thus, both of a customer and a clerk can put coins in the first input port 212a from the opening 312 through the coupling unit 330.

In the example illustrated in FIG. 18, the base 310 can move by changing a position of the support unit 320. The coupling unit 330 also has flexibility. Thus, the base 310 can be moved while the coupling unit 330 is connected to the opening 312 of the base 310 and the first input port 212a of the settlement device 20.

In the example illustrated in FIG. 18, both of a customer and a clerk can put coins in the first input port 212a of the settlement device 20 by disposing the base 310 in a position that makes easy for both of the customer and the clerk to put the coins in through the opening 312.

Fifth Example Embodiment

Figure 19:
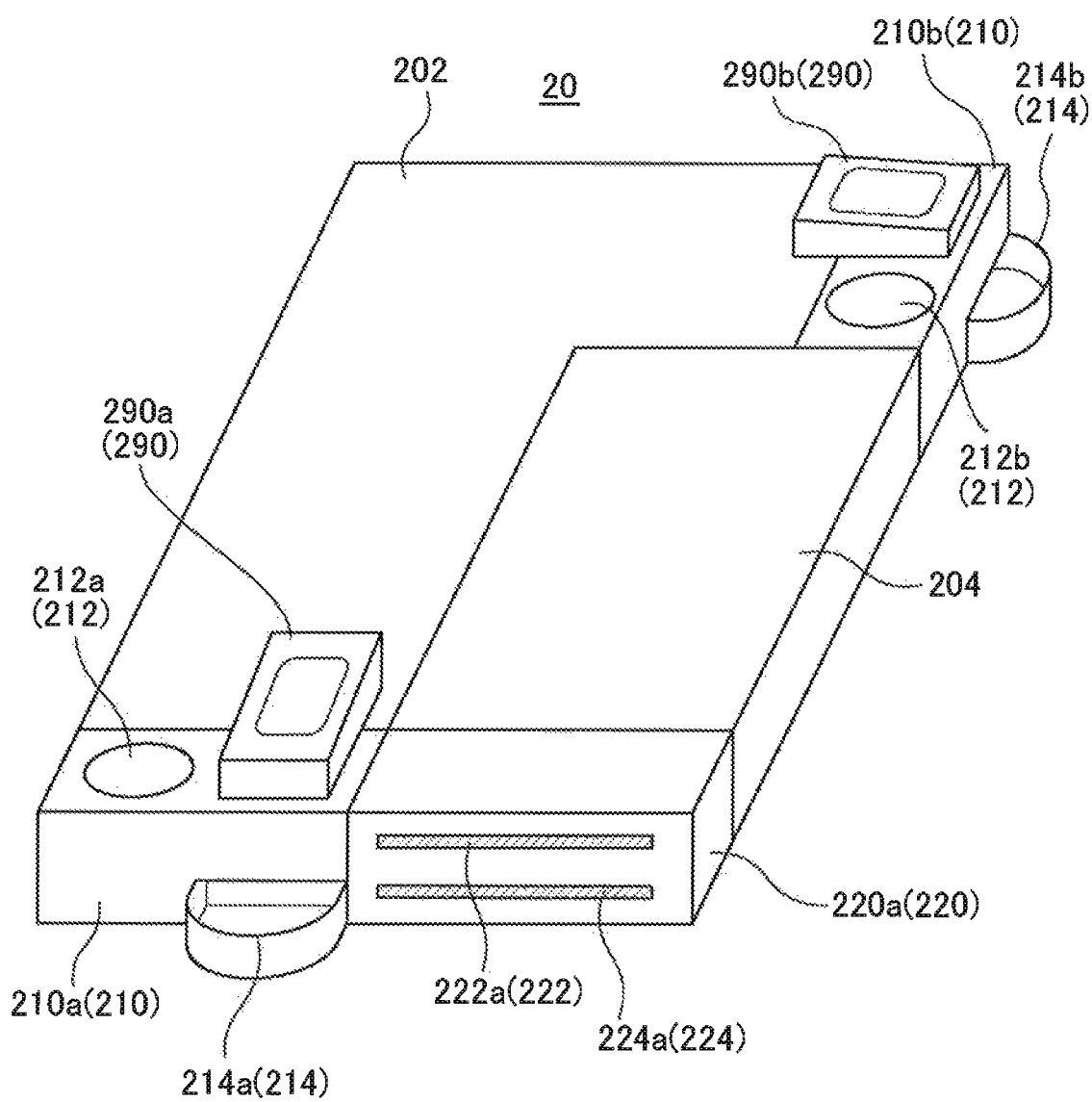
FIG. 19 is a perspective view illustrating a configuration of a settlement device used for a POS device according to a fifth example embodiment.

FIG. 19 is a perspective view illustrating a configuration of a settlement device 20 used for a POS device according to a fifth example embodiment and corresponding to FIG. 2 in the first example embodiment. The POS device according to the present example embodiment has the same configuration as that of the POS device according to the first example embodiment except for a reading device 290 (a first reading device 290a and a second reading device 290b).

In the example illustrated in FIG. 19, the first reading device 290a and the second reading device 290b face in directions different from each other. The first reading device 290a and the second reading device 290b can read data used for payment processing. Specifically, in the example illustrated in FIG. 19, the first reading device 290a and the second reading device 290b can read data of electronic money.

In the example illustrated in FIG. 19, a clerk and a customer respectively allow the first reading device 290a and the second reading device 290b to read data of electronic money in a similar manner that a clerk and a customer can respectively put coins in the first input port 212a and the second input port 212b in the first example embodiment.

Note that data (data used for payment processing) readable by the reading device 290 (the first reading device 290a and the second reading device 290b) is not limited to the data of the electronic money. For example, the reading device 290 may be able to read data of a credit card. In this case, for example, an opening for insertion of a credit card is formed in the reading device 290.

While the example embodiments of the present invention have been particularly described with reference to the drawings, these example embodiments are examples of the present invention and various configurations other than those described above can also be adopted.

This application is based upon and claims the benefit of priority from Japanese patent application No. 2015-195081, filed on Sep. 30, 2015, the disclosure of which is incorporated herein in its entirety by reference.

REFERENCE SIGNS LIST

10 Commodity registration device
20 Settlement device
100 Computer
110 Input device
120 Reading device
130 Display
132 Clerk display
134 Customer display
140 Printer
160 Bus
172 Processor
174 Memory
176 Storage
178 Input-output interface
180 Network interface
200 Computer
202 Coin case
204 Bill case
210 Coin unit
210a First unit
210b Second unit
212 Coin input port
212a First input port
212b Second input port
214 Coin dispensing port
214a First dispensing port
214b Second dispensing port
220 Bill unit
220a First unit
220b Second unit
222 Bill input port
222a First input port
222b Second input port
224 Bill payment port
224a First dispensing port
224b Second dispensing port
230 Coin housing unit
232 Coin path
234 Coin validator
242 Bill path
244 Bill validator
252 Coin calculating unit
254 Bill calculating unit
260 Bus
272 Processor
274 Memory
276 Storage
278 Input-output interface
280 Network interface
290 Reading device 290a First reading device
290b Second reading device
310 Base
312 Opening
320 Support unit
330 Coupling unit

What is claimed is:

1. A POS device that settles payment for a commodity, the POS device comprising:
   a first coin input port and a first bill input port facing a customer to receive first currencies from the customer;
   a second coin input port and a second bill input port facing a sales clerk to receive second currencies from the sales clerk; and
   a coin validator and a bill validator configured to validate a kind of the first currencies and a kind of the second currencies in accordance with a settlement,
   wherein a total amount of the first and second currencies is a settlement amount which the customer pays for the commodity, and comprises an amount of coins which the customer pays for the commodity.

2. The POS device according to claim 1, wherein:
   the validator is configured to pass both of the currencies put from the first currency input port and the second currency input port.

3. The POS device according to claim 1, further comprising:
   a totaling unit configured to calculate by adding up an amount of the first currencies and an amount of the second currencies.

4. The POS device according to claim 1, wherein
   the first currency input port and the second currency input port are disposed operably from different directions.

5. The POS device according to claim 4, further comprising:
   a case capable of housing the currencies;
   a first unit that is provided outside the case, includes the first input port formed, and includes a path connected from the first currency input port to a space inside of the case; and
   a second unit that is provided outside the case, includes the second currency input port formed, and includes a path connected from the second currency input port to a space inside of the case, wherein
   the first unit and the second unit face in directions different from each other.

6. The POS device according to claim 5, wherein
   a direction in which the first unit faces is different from a direction in which the second unit faces by greater than or equal to 60 degrees and less than or equal to 120 degrees.

7. The POS device according to claim 6, wherein
   a direction in which the first unit faces is different from a direction in which the second unit faces by 90 degrees.

8. The POS device according to claim 5, wherein
   the first unit and the second unit face opposite to each other.

9. The POS device according to claim 1, wherein
   the first input port forms at least a part of a user interface designed for the customer, and
   the second input port forms at least a part of a user interface designed for the sales clerk.

10. The POS device according to claim 1, further comprising:
    a first currency dispensing port facing a customer;
    a second currency dispensing port facing a sales clerk; and
    an input unit configured to determine whether the currencies are dispensed from the first currency dispensing port or the second currency dispensing port.

11. The POS device of claim 1, wherein the first currency input port comprises a first reader configured to receive electronic payment linked to an account of the customer,
    and wherein the second currency input port comprises a second reader configured to receive electronic payment linked to the account of the customer.

12. The POS device of claim 1, further comprising a reader to register the commodity.

13. The POS device of claim 1, wherein the total amount of the first and second currencies further comprises an amount of bills which the customer pays for the commodity.

14. A control method of a POS device that settles payment for a commodity, comprising:
    inputting first currencies from a customer through a first coin input port and a first bill input port, facing the customer, configured to receive first currencies;
    inputting second currencies from a customer through a second coin input port and a second bill input port, facing the sales clerk, configured to receive first currencies;
    validating, using a coin validator and a bill validator, a kind of the first currencies received at the first input port and the first currencies received at the second input port in a settlement; and
    settling the payment of the commodity using an amount of the first currencies and second currencies,
    wherein a total amount of the first and second currencies is a settlement amount which the customer pays for the commodity, and comprises an amount of coins which the customer pays for the commodity.

15. The control method of claim 14, wherein the total amount of the first and second currencies further comprises an amount of bills which the customer pays for the commodity.

16. A payment device that settles payment for a commodity, the payment device comprising:
    a first coin input port and a first bill input port facing a customer to receive first currencies from the customer;
    a second coin input port and a second bill input port facing a sales clerk to receive second currencies from the sales clerk; and
    a coin validator and a bill validator configured to validate a kind of the first currencies and a kind of the second currencies in accordance with a settlement,
    wherein a total amount of the first and second currencies is a settlement amount which the customer pays for the commodity, and comprises an amount of coins which the customer pays for the commodity.

17. The payment device of claim 16, wherein the total amount of the first and second currencies further comprises an amount of bills which the customer pays for the commodity.

* * * * *